US006077587A

United States Patent [19]

Potok

[11] Patent Number: 6,077,587

[45] Date of Patent: Jun. 20, 2000

[54] ANTI-THEFT DEVICE FOR PERSONAL OR COLLECTIVE ARTICLES USED PARTICULARLY ON THE BEACH

[76] Inventor: Francis Potok, 9, rue Croix Baragon, 31000 Toulouse, France

[21] Appl. No.: 08/793,688

[22] PCT Filed: Sep. 5, 1995

[86] PCT No.: PCT/FR95/01149

§ 371 Date: Apr. 4, 1997

§ 102(e) Date: Apr. 4, 1997

[87] PCT Pub. No.: WO96/07808

PCT Pub. Date: Mar. 14, 1996

[30] Foreign Application Priority Data

Sep. 6, 1994 [FR] France .................................. 94 10820

[51] Int. Cl.[7] ........................................................ B32B 3/06

[52] U.S. Cl. .................................... 428/99; 70/62; 70/63; 70/65; 70/234; 428/81; 428/98; 428/101; 428/102; 428/121; 428/193

[58] Field of Search ................................ 428/81, 99, 98, 428/101, 102, 121, 193; 383/6, 12, 72, 75; 70/62, 63, 65, 234; 244/145

[56] References Cited

U.S. PATENT DOCUMENTS

| | | | |
|---|---|---|---|
| 3,602,462 | 8/1971 | Slater | 244/145 |
| 3,741,505 | 6/1973 | Engel | 244/145 |
| 4,180,867 | 1/1980 | Ridgeway | 2/89 |
| 4,499,133 | 2/1985 | Prince | 428/81 |
| 4,924,893 | 5/1990 | Furey | 133/16 |

*Primary Examiner*—Nasser Ahmad
*Attorney, Agent, or Firm*—Harrison & Egbert

[57] ABSTRACT

An anti-theft device having a thin element configured like a flexible material sheet which can be extended flat on the ground and a plurality of flexible ties which are attached to the periphery of the element and to a unique junction part fixed to the article to be protected against theft. The thin element is covered with a ballast-forming sand layer. Any traction exerted on the protected article will result in the back-folding of the element around the ballast by the tightening of the sides of the element so as to form a burden opposing the traction effort exerted on the article to be protected.

9 Claims, 4 Drawing Sheets

ANTI-THEFT DEVICE FOR PERSONAL OR COLLECTIVE ARTICLES USED PARTICULARLY ON THE BEACH

THE TECHNICAL FIELD

The instant invention teaches an anti-theft device for personal or collective articles to be used at the beach or other leisure venue, or likewise at places of work, such as construction sites.

BACKGROUND ART

As a means of protecting articles used at the beach against theft, one could attach the articles to a stake with radiating spokes driven into the sand to an adequate depth. This type of implement, by opposing an important resistance to any traction exerted on the protected article, effectively deters theft. However, the downside to such an implement is that it is cumbersome and relatively heavy which makes transport and storage in a traditional beach bag, for instance, rather inconvenient.

The instant invention seeks to resolve the aforementioned problems by proposing an anti-theft device that is particularly light, flexible and devised so as to form a ballast opposing an important resistance to a traction effort exerted on the article to be protected.

SUMMARY OF THE INVENTION

To that end, the anti-theft device according to the instant invention for personal or collective articles used at the beach or other leisure venue, or likewise at places of work, essentially distinguishes itself in that it is comprised of a thin element configured like a sheet in a polygonal, circular or curvilinear shape, of a flexible material, which may be extended flat on the ground, and of a plurality of flexible ties which are attached on the one hand to the periphery of the element and, on the other hand, to a unique junction part fixed to the article to be protected against theft, such that, the thin element having been extended flat on the beach and covered by a ballast-forming layer of sand, any traction exerted on the article to be protected will result in the back-folding of the element around the ballast by the tightening of the sides of the element so as to form a burden opposing an important resistance to the traction effort exerted on the article to be protected.

The thin element is preferably comprised of a piece of fabric which gives it considerable lightness and allows it to be flexible under a weak mass. With such an element, the anti-theft device is suited for use on a sandy beach. For use on a pebbly beach or a gravel beach, the invention according to another embodiment provides for a flexible element comprised of a fine-mesh net.

According to another characteristic of the invention, the flexible ties are attached along premade receptacles fixed on the peripheral border of the flexible element, said ties being hemmed into their respective receptacles and each one among them being here and there attached also to the junction piece.

Other advantages, goals and characteristics of the instant invention will become evident with the reading of the description of a preferred embodiment given by way of example therefore, referring to the attached drawings of which:

DETAILED DESCRIPTION OF THE INVENTION

Figure 1:
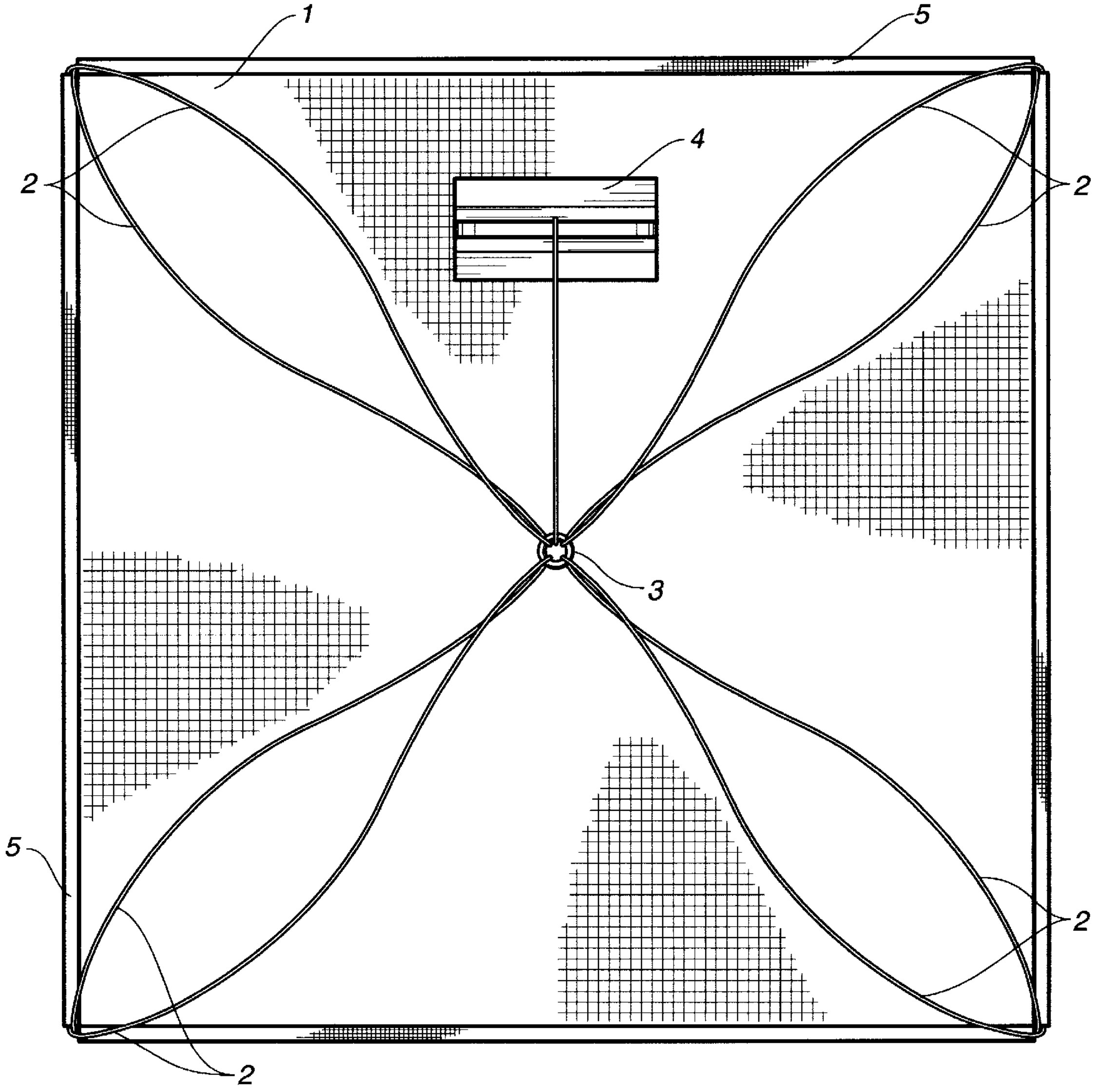
FIG. 1 is a view from above of the device according to the invention.

In FIG. 1, an anti-theft device according to the invention is shown comprised of a thin, flexible element (1), made either of fabric or of a fine-mesh net, and of a plurality of flexible ties (2), such as strings, attached on the one hand to the peripheral border of the flexible element and, on the other hand, to a unique junction part (3), fixed to the article (4) to be protected against thefts which could be a beach bag, a cooler, and, more generally, any sort of ordinary object usable at the beach or other leisure venue, or likewise at a place of work.

The flexible element (1) is preferably of a polygonal shape, for example either square or rectangular, but in variation, the shape of the element (1) could be circular or curvilinear. Its surface area would be, for example, approximately one square meter.

The flexible element (1) will be made of a synthetic material of fine density and of high mechanical resistance, possessing additionally a good resistance against the corrosive power of salt. More precisely, any material used in the textile industry which meets the aforementioned criteria could be used.

The flexible ties (2), preferably of equal length, can be firmly attached to the peripheral border of the element (1) by stitching or other appropriate means, but according to a preferred embodiment, they are attached along premade receptacles (5) fixed along the peripheral border of the flexible element (1) into which they are hemmed. As can be seen in FIG. 1, each tie (2) passes right through its receptacle (5) and forms two strings at the exterior of each receptacle by the ends of which it is attached to the junction piece (3).

The receptacles (5) each extend along one portion of the periphery of the element (1) and are attached to said element and, when said element is in the shape of a polygon, said receptacles extend respectively along the sides of the element as can be seen in FIG. 1.

According to a first embodiment, each receptacle (5) is comprised of a sheath formed in the manner of a hem, in other words, by first doubling back upon itself the corresponding border of the element (1) and then by creating a longitudinal seam.

Figure 2:
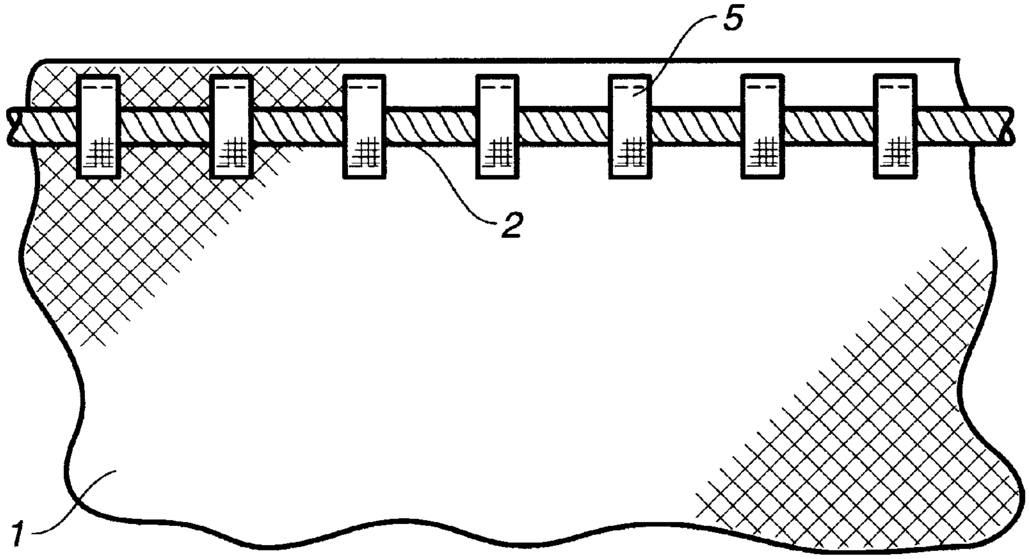
FIG. 2 is a close-up view of one of the slides according to another embodiment

According to a second embodiment, as can be seen in FIG. 2, each receptacle is formed by multiple loops, each one comprised of a band of material sewn to piece (1) or otherwise by rings also sewn to said piece. According to these two embodiments, the loops constituting the receptacle each extend perpendicularly along the corresponding side.

The junction piece (3) can be in the form of a solid ring to which are attached one by one, by knotting or other means, the ends of the strings of each tie. In variation, the ends of each string can be directly attached to the junction piece. According to yet another variation of execution, one could have the flexible ties all be formed from one continuous cord passed through each receptacle and between two successive slides in ring (3).

The junction piece (3) is bound by any means known in the art to the article (4) to be protected against thefts. For example, one could use a metal cable firmly attached by one of its two extremities to the junction piece (3). By its other extremity, this cable would be attached to a padlock, for instance, to which would be attached the article to be protected against thefts.

Figure 5:
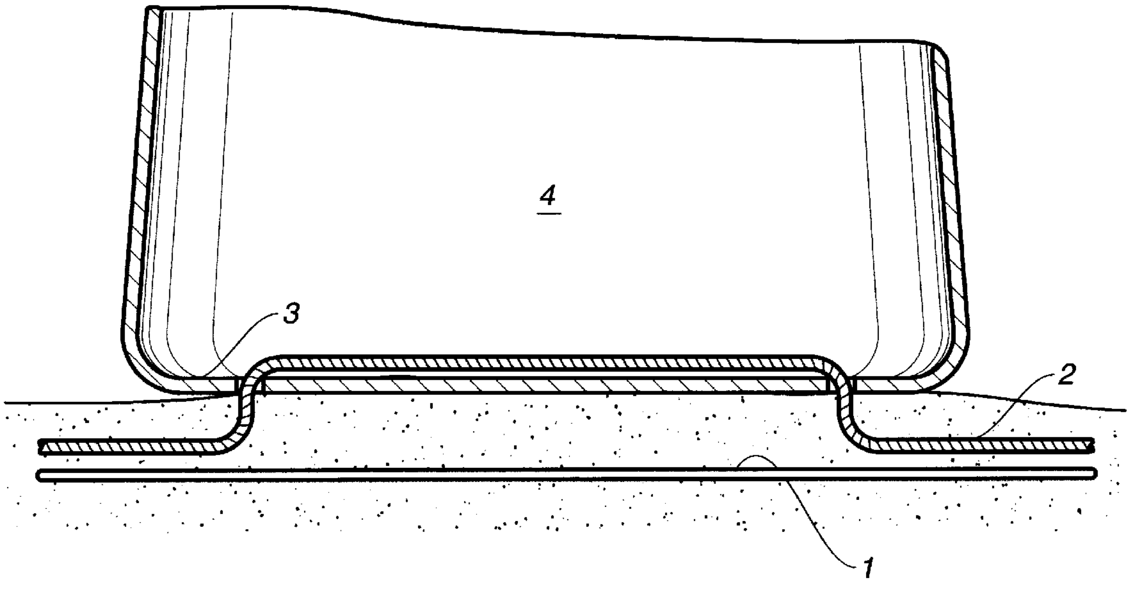
FIG. 5 shows a junction piece according to another embodiment.

We have just described a junction piece which is independent of the article to be protected against thefts, however according to a variation, one could envision a junction piece comprised of an element of the article to be protected against thefts. Thus, merely by way of example, such as the one illustrated in FIG. 5, the article to be protected against thefts is a beach bag and the junction piece is comprised of the base of the bag pierced by several orifices into which are attached the different strings of the flexible ties.

Now to explain the implementation and functioning of the device according to the invention.

Figure 3:
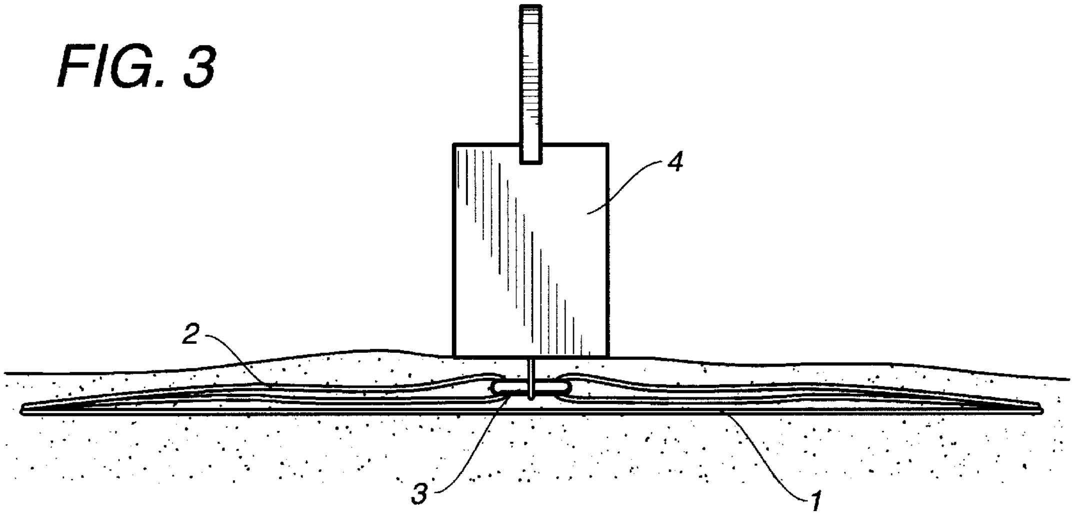
FIG. 3 is a cross-section view showing a device according to the invention equipped with a ballast comprised of a layer of sand.
Figure 4:
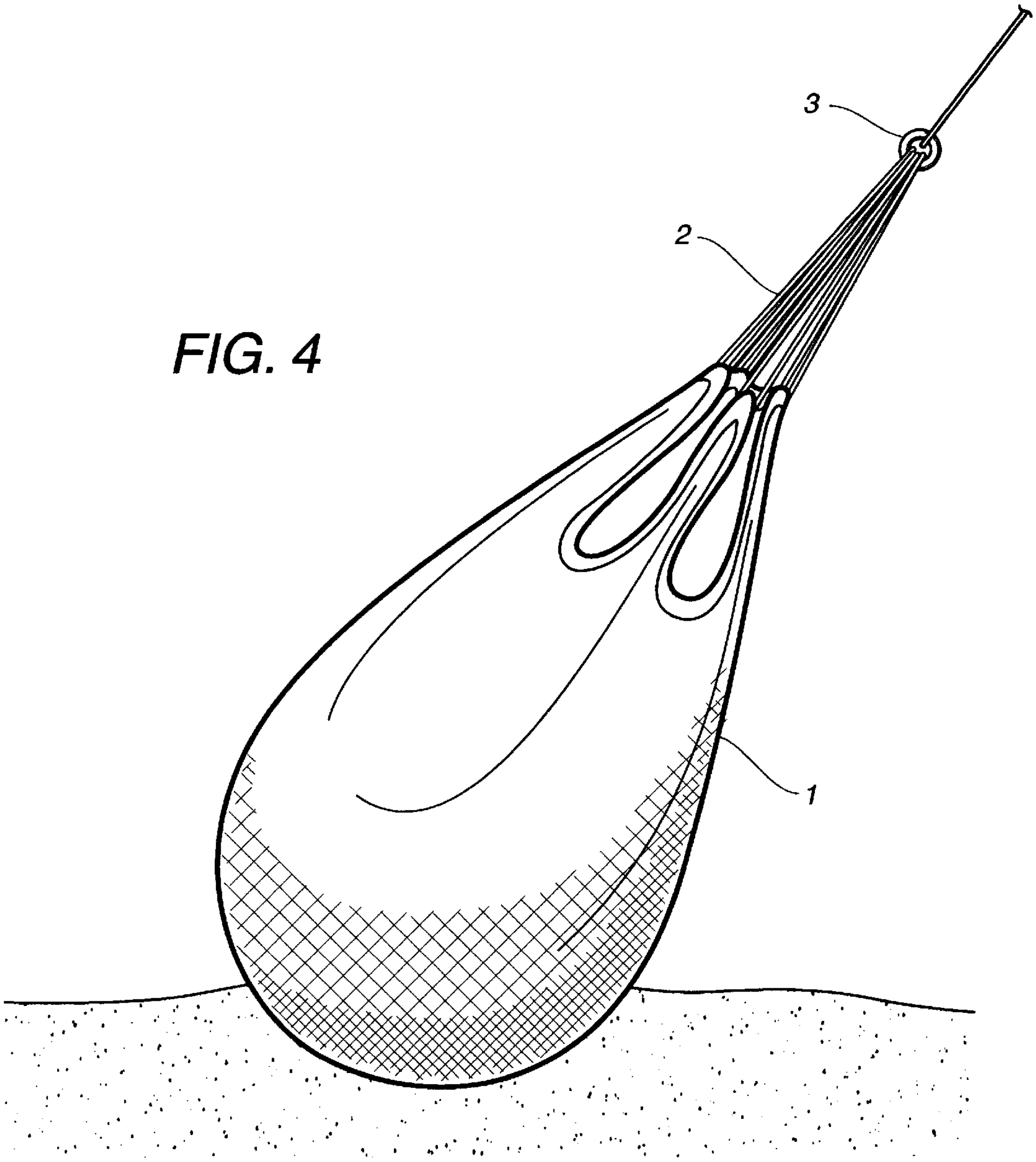
FIG. 4 is a view of the device in configuration of resistance against a traction effort exerted on the article to be protected against theft.

The element (1) is first spread out on the beach, the flexible ties (2) and the junction piece (3) being laid out on top. Next, the element (1) is fully covered by a layer of sand and the junction piece is attached to the article to be protected against thefts (FIG. 3). The device so ballasted is now ready to serve its function as shown in FIG. 4. In this Figure, it is apparent that a traction effort exerted on the protected article results in the back-folding of the flexible element (1) around the ballast by the tightening of the sides of the element (1) which results in the enclosure of the mass of sand comprising the ballast or the majority thereof within the sack thusly formed. Due to the mass of sand, the device effectively deters theft of the article. It is important to note that, given the surface area of the flexible element, which is approximately one square meter, a layer of sand of approximately one centimeter will prove sufficient.

The device according to the invention is flexible under a weak mass such that it can be easily transported in a beach bag for example.

Finally, it is important to note that the flexible element (1) is achieved by weaving together fibers of a synthetic material, such as for instance fibers of "Nylon(TM)", of "KEVLAR(TM)".

What is claimed is:

1. An anti-theft device comprising:

an article to be protected against theft, said article having a junction piece attached thereto;

a flexible sheet which is capable of laying flat on the ground, said sheet having a plurality of receptacles extending along peripheral edges of said sheet;

a plurality of flexible ties respectively extending freely through said plurality of receptacles, each of said plurality of flexible ties having opposite ends affixed to said junction piece, said plurality of flexible ties being affixed to said flexible sheet and to said junction piece such that when the flexible sheet is laid flat and covered by a ballast-forming sand layer, any traction exerted on the article results in a collapsing of the flexible sheet around the sand layer by a tightening of the peripheral edges of said flexible sheet.

2. The device according to claim 1 wherein the flexible sheet is a piece of fabric.

3. The device according to claim 1 wherein flexible element is a net.

4. The device according to claim 2 wherein each of said plurality of receptacles is comprised of a sheath.

5. The device according to claim 2 wherein each of said plurality of receptacles is formed by multiple loops.

6. The device according to claim 5 wherein each loop therefor is comprised by a ring attached to the flexible sheet.

7. The device according to claim 1 wherein the junction piece is a ring.

8. The device according to claim 1 wherein the junction piece is an element of the article to be protected against thefts.

9. The device according to claim 1 wherein the flexible element is in the shape of a polygon.

* * * * *